United States Patent [19]

Barth et al.

[11] Patent Number: 4,599,510

[45] Date of Patent: Jul. 8, 1986

[54] VIBRATION-MINIMIZING MAGNETIC CARD READER

[76] Inventors: Merlyn Barth, 729 W. Lockwood, Glendale, Mo. 63122; Joseph Kosednar, 2030 Seven Rines Dr., Creve Coeur, Mo. 63141

[21] Appl. No.: 568,384

[22] Filed: Jan. 5, 1984

[51] Int. Cl.$^4$ .................................................. G06K 7/08
[52] U.S. Cl. .................................... 235/449; 235/477; 235/480; 360/2
[58] Field of Search ............... 235/379, 449, 477, 480, 235/493; 360/2

[56] References Cited

U.S. PATENT DOCUMENTS

| | | | |
|---|---|---|---|
| 3,705,396 | 12/1972 | Nagaki et al. | 235/477 X |
| 3,959,623 | 5/1976 | Nakahara | 235/480 X |
| 4,300,041 | 11/1981 | Nama | 235/449 |
| 4,370,550 | 1/1983 | Sidline | 235/449 |

Primary Examiner—David L. Trafton
Attorney, Agent, or Firm—Jerome A. Gross

[57] ABSTRACT

A reader-writer for magnetic cards substantially reduces "jitter" or chattering vibrations which otherwise imperil the accuracy of the read-write functions. The read-write head is itself mounted rigidly for operating while the magnetic card passes along a planar tray surface. A soft rubber anvil roll is mounted directly opposite, for free idling rotation on the same shaft which impels a rubber driving wheel.

In contrast with conventional constructions using a spring-mounted head or anvil, the present rigidly mounted head in combination with the free idling soft anvil roll avoids the generation of, and damps out, vibrations, which otherwise might follow from exciting forces such as irregularities in driving friction. The greatly improved accuracy makes feasible the use of debit cards, and has unexpectedly reduced head wear.

5 Claims, 2 Drawing Figures

VIBRATION-MINIMIZING MAGNETIC CARD READER

TECHNICAL FIELD

This invention relates to reader-writer mechanisms for cards encoded longitudinally with magnetic information; and has particular application to those cards whereon information is encoded so closely that reading and writing functions may be impaired by vibrations of the reader-writer head and/or the anvil mechanism associated therewith.

BACKGROUND ART

Simple readers for cards, magnetically encoded along a longitudinal strip, conventionally having a motor-driven driving wheel which engages the surface of the card for delivering it between a reader-writer head and a pressure anvil which may be presented directly opposite the reader-writer head. In conventional equipment heretofore in use, either the anvil or the head has been held by a spring device. Vibrations, as between the head and the anvil, have caused errors in reading and writing, and may contribute to severe head wear, requiring frequent replacement.

When a card to be read starts to pass between the head and the pressure anvil, in a conventional system the physical movement perpendicular to the plane of the card and equal to its thickness, may initiate vibrations which are not readily damped. A less obvious but more continuing source of such vibrations appears to be intermittency of friction in the drive system, accompanying longitudinal movement between the read-write head and its anvil. These sources, as well as still other causes, may excite vibrations in the head or its anvil; if the length of a bit of magnetically encoded information is short relative to the period of vibration, there may be serious malfunctions in the read-write function. Where accurate reading and writing are imperative, as with "debit" cards wherein encoded information is rewritten in modified form upon the performance of a command, such vibrations may seriously impair the functioning of the system.

As contrasted with magnetically encoded cards used for simple functions, for example, to open the gate of a parking lot, a magnetically encoded debit card must be reliably resistant to errors produced by vibrations and intermittency in magnetic reading and writing. Spurious variations in pulse time characteristics, termed "jitter," may follow from such vibrations.

DISCLOSURE OF THE INVENTION

The present vibration-minimizing card reader is designed specially for debit card reader-writer apparatus where much information is to be encoded on the card and, effective on delivering an electrical command, the drive reverses and its information is rewritten in modified form to reflect the fact that the command has been delivered. Such debit cards require perfect accuracy, for failure to read and modify accurately may make the system substantially inoperative.

In apparatus embodying the present invention, a planar card tray, including side guide means, provides a longitudinal delivery path along whose under side a magnetic reader head is presented rigidly. A transverse shaft, driven by the motor, carries a soft rubber-like anvil roll mounted directly above the reader head for free idling rotation. As a driving roll, rigidly engaged to the same shaft, drives a magnetic card between the rigidly positioned magnetic head and its soft idling anvil roll, intermittency of the driving friction and other exciting forces may cause slight irregularities in the movement of the card past the reader head. The idling rotational movement, the deflectance and the vibration damping characteristic of the rubber-like anvil roll together avoid generation, by such exciting causes, of vibrations which in a conventional system would cause chattering or "jitter" that is, spurious variations in pulse time characteristics. By so minimizing "jitter," the magnetic information may be read and re-written so reliably as to permit reliance thereon in new business functions, such as debit card vending operations.

THE DRAWINGS

BEST MODE FOR CARRYING OUT THE INVENTION

Figure 1:
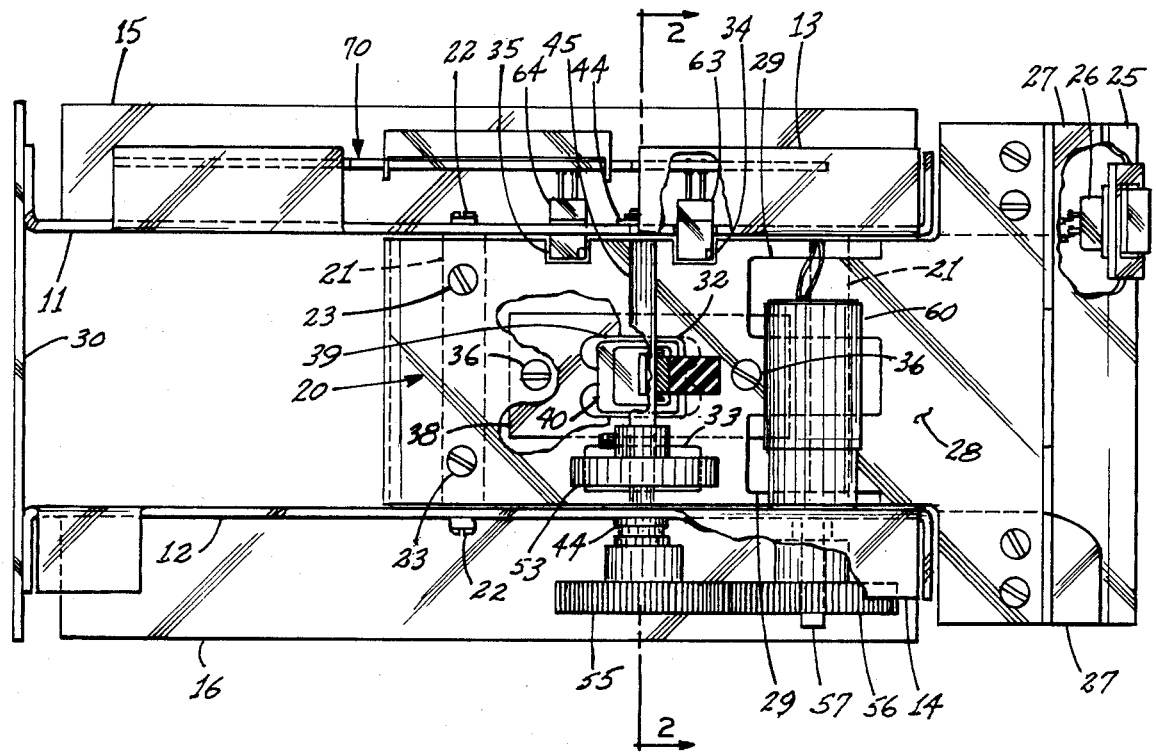
FIG. 1 is a plan view, partly broken away, showing the structure and mechanism of a vibration minimizing card reader embodying the present invention.

The structure utilized in the present vibration minimizing card reader will be first described. A pair of vertical outwardly flanged channel-like side guide plates 11, 12, are employed, shown with their upper flanges 13, 14 partly cut away, and whose lower flanges 15, 16 may serve as base supports. The guide plates 11, 12 form side guides for a horizontal planar delivery plate generally designated 20, which is supported between on the guide plates 11, 12 by a pair of rigid cross beams 21. In the drawing, FIG. 1, the cross beams 21 are mounted to the side plates 11, 12 by end screws 22, and the delivery plate 20 is mounted on the cross beams 21 by counter-sunk screws 23.

At its entrant end, shown at the right side of FIG. 1, beyond the guide plates 11, 12 the planar delivery plate 20 is widened and has a downward bent entrant flange 25, at one side of which (shown above in FIG. 1) is mounted a command switch 26.

Small tapered spacer plates 27, slightly thicker than the magnetic card to be read, are mounted on opposite sides of the widened end portions of the delivery plate 20, to lead a magnetic card between the side guide plates 11, 12. The spacer plates 27 establish a suitable spacing from the delivery plate 20 to a top guide plate 28 whose right end is mounted on the spacer plates 27 and which has a pair of guide finger portions 29 extending inwardly. At the opposite end the side guide plates 11, 12 are closed by a rigid vertical end plate 30.

The structural elements so described make up a rigid planar card tray, in which the upper horizontal surface of the planar delivery plate 20, bounded by the inward surfaces of the guide plates 11, 12, provides a longitudinal delivery path for a card which has been magnetically encoded along a central longitudinal stripe.

Figure 2:
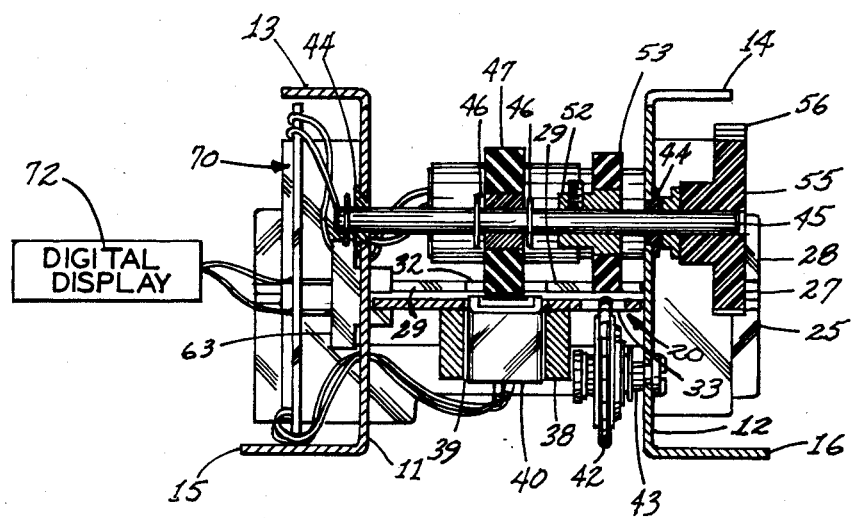
FIG. 2 is a cross-sectional view taken along line 2—2 of FIG. 1.

The delivery plate 20 has several apertures, including reader head central rectangular aperture 32 and an idler drive roll aperture 33, shown at the right side of FIG. 2; these are aligned with each other transverse to the longitudinal delivery path along the section line 2—2 in FIG. 1. Two other apertures in the delivery plate 20 are a first sensor aperture 34, spaced in advance of that transverse location, and a second sensor aperture 35 equally spaced therefrom on the opposite side.

Mounted to the underside of the delivery plate 20 by counter-sunk screws 36 is a rigid support block 38 having a window 39 firmly mounting a conventional magnetic reader-writer head 40. The head 40 is of the conventional type having reader-writer capability, and is presented upward through the reader head aperture 30, slightly above the plane of the delivery plate 20. Through the idler roll drive aperture 33 there extends, somewhat farther above the plane of the delivery path, a drive idler roll 42, mounted on a horizontal stub shaft 43 in the guide plate 12 and aligned with the reader-writer head 40 along the cross-section at which FIG. 2 is taken.

Shaft bushings 44 in the guide plates 11, 12 at the same cross-section and at a level fixedly spaced above the planar delivery plate 20, mount a transverse shaft 45. At substantially its center, aligned directly above the reader-writer head 40 and retained, as by snap rings 46 on either side, is a soft rubber anvil roll 47 having a central bushing 48. The anvil roll 47 is preferably so soft that in undeflected position it contacts, or extends very close to, the reader-writer head 40, so that when a magnetic card, generally designated 50, passes thereunder, the lower portion of the anvil roll must deflect upwards by substantially the thickness of the card.

Rigidly mounted by a hub 52 on the same shaft, just inward of the righty side guide plate 12 shown in FIG. 2 and immediately above the idler roll 42, is a driving roll 53. While made of rubber or of a rubber-like compound, it is preferably characterized by greater resistance to deflection than the anvil roll 47 and is of somewhat lesser diameter as seen in FIG. 2, so as to contact the idler drive roll 42. It deflects sufficiently to exert compression against, and therefore driving friction on, the upper surface of a magnetically encoded card, not shown, passing over the drive idler roll 42.

At the end of the transverse shaft 45 which projects outward of the side plate 12 as shown at the right side of FIG. 2, a driven gear 55 is mounted, in mesh with a similar driving gear 56 seen to the right of it in FIG. 1. The driving gear 56 is mounted on a motor shaft 57 which extends through the side plate 12 and is driven by a reversible electric motor 60 accommodated between the side plates 11, 12.

The electronic components and circuitry utilized may be substantially conventional, and are shown schematically. Positioned for reading through the first and second sensor apertures 34 and 35 are a first optical sensor 63 and a second optical sensor 64. Their circuitry so connects them as to signal when such a magnetically encoded card passes between them, thus indicating its progress along the planar delivery plate 20.

Mounted on the outer side of the channel-like side guide plate 11, shown to the left side of FIG. 2, and protected by its upper and lower flanges 15, 16, is an electronic circuit board generally designated 70. Its circuitry receives the signal from the first sensor 63, enables the reader circuitry, starts the motor 60, causes the driving roll 53 to engage such magnetic card, to drive it, and to read its magnetically encoded strip as it passes across the reader-wrtiter head 40; the circuitry stores and verifies the encoded information, and causes the motor 60 to cease driving when the card reaches a position where the first sensor 63 no longer signals the presence of the card. Portions of the information so read, for example, the amount of credit remaining on a debit card, may be displayed on a digital display 72.

When the magnetic card has passed beyond the first sensor 63 and has stopped, its trailing portion will still be engaged by the driving roll 53. Then the generation of a command, as by actuating the command switch 26 (assuming the command corresponds to one for which the card is authorized) causes the circuitry to adjust the quantity or amount for which the card is valid after execution of the command; to actuate the motor 60 in reverse direction and to actuate the "write" function. Thus, as the card is driven in reverse direction, the head 40 rewrites on the card that part of the encoded information which is modified to reflect the execution of the command. The driving roll 53 continues to drive the card until it passes the first sensor 63, causing the motor 60 to cease driving; at this point the end of the card will be accessible to the reader for manual removal.

From the foregoing description of the operation of the present device, which is typical of conventional circuitry, the importance of utter reliability in the reading and writing functions is manifest. Should there be any error in reading, there might be, for example, a failure to display correctly the amount or quantity for which the card was valid, or failure to verify that the command given was of the type which was authorized. A failure in writing might eradicate information which was not to have been revised, or might magnetically encode, as a quantity or amount of credit remaining, an entirely erroneous figure. In any such event, the result would be to render the system unacceptable; precision in reading the writing is here of serious importance. To achieve such precision with reliability, it is of the utmost necessity to minimize mechanical problems in the system.

The present invention has demonstrated that it substantially overcomes jitter or chattering in the reader-writer head or its anvil, and thus affords greater commercial acceptability to debit card merchandising. When a magnetic card 50 is inserted so that a signal from the first sensor 63 actuates the motor 60, on engagement by the driving roll 63, there must be a spreading to accommodate the card. Yet if either the reader-writer 32 or anvil opposite it had a spring-like suspension, there would tend to be a reversing movement, both perpendicular to the plane of the card and longitudinal in-plane. Such reversing movements tend not to die out, but instead to be excited into vibrations by irregular driving, such as due to frictional discontinuities exerted by the driving roll 53 against the surface of the card, or perhaps by minor surges in the torque delivered by the motor 63.

Using the present invention, the softly compressible anvil roll 56 accommodates the initial shock of contact with the edge of the card 60 in two ways: by compressive deflection of the anvil roll 56 and by its idling rotation relative to the drive shaft 45. Because of such idling rotation, the anvil roll 56 need not undergo torsional deflection. For the same reason, irregularities in driving friction do not serve to excite vibration; they also are accommodated by the anvil roll's freedom to rotate in an idling sense on the shaft, as well as by the damping afforded by its soft rubber material. Meantime, the rigid support offered by the windowed support block 38 to the reader-writer head 40 maintains it free from vibrations caused by any such excitations.

The present apparatus may be employed in debit card merchandising systems with substantial freedom from concern of malfuction. For example, food vending machines may be operated by such cards, in a system in which a first card reader-writer encodes a card to increase the amount of its credit on command given by inserting dollar bills successively; in this case on the reading movement, the display 72 would show the amount of money for which the card has previously been valid, and each command would rewrite the card to increase this amount by one dollar. For selection of food of different prices from a vending machine, the card is then inserted in the reader-writer device of the vending machine, its digital display showing the amount for which the card is valid; and to dispense a selected food the rewrite operation functions to debit the amount, for which the card is valid, by the sales price of the particular food item chosen. Relying in the present case on the rigid mount of the reader head and the characteristics of the idling soft rubber anvil roll, there is achieved the high degree of reliability necessary for public acceptance of such a merchandising system.

An unexpected result experienced is a substantial increase in life of the reader-writer head; this is thought to follow from the reduction in vibrations achieved.

From the foregoing disclosure, variations in organization and construction, to serve similar and related purposes, will be apparent to those skilled in the art.

We claim:

1. A vibration-minimizing card reader for magnetically encoded cards, comprising a planar card tray adapted to support a magnetically encoded card for movement in a longitudinal delivery path therealong, a magnetic reader head presented rigidly along said path and at substantially the level of said planar card tray, electronic circuitry so connected to said reader head as to verify data encoded longitudinally on such cards and, on such verification, to direct the performance of an electronic command, a transverse shaft in longitudinal registration with said reader head and having an axis at a level fixedly spaced from the plane of said card delivery tray, a radially deflectable rubber-like anvil roll so mounted on said shaft, immediately opposite to said reader head, as to permit idling rotation movements of the roll relative to the shaft, and means to engage and drive such encoded card along the longitudinal delivery path of said planar card tray, said means to engage and drive including a motor, means to engage it to said transverse shaft, a driving roll mounted on and secured to said shaft spaced axially from said anvil roll, and a driven roll projecting upward through and beyond the level of said planar card tray, said driving roll being of smaller diameter than and being characterized by greater resistance to deflection than said anvil roll, whereby the deflectance and damping characteristics of the rubber-like anvil roll, and its idling rotational movements, avoid vibrations in card reading and writing.

2. A vibration-minimizing card reader as defined in claim 1, wherein the delivery path of the planar card tray is substantially along an upper surface of said card tray and is horizontal, and the axis of the transverse shaft is above the plane of said card delivery tray, and the reader head extends through an aperture in the card tray to the plane of such path.

3. A vibration-minimizing card reader as defined in claim 1, together with optical sensor means, positioned along the planar card tray at either side of the reader-writer head, to start and stop the motor responsive to the position of an encoded card along such longitudinal delivery path.

4. Debit card reader-writer apparatus, comprising a vibration-minimizing magnetic card reader as defined in claim 1, wherein said electronic circuitry includes means to store encoded information read from such card, and means effective on delivering an electrical command, to so modify the encoded information as to reflect the delivery of such command, to energize the motor to drive such card in reverse direction, to cause the reader head to write the modified information on the card as it proceeds in such reverse direction, and to deliver the card from the reader.

5. A vibration-minimizing card reader as defined in claim 1, wherein the card tray includes side guide means for delimiting such path and said transverse shaft is mounted on said side guide means, outwardly of said anvil roll and said driving roll.

* * * * *